United States Patent
Yen

[19]

[11] Patent Number: 5,880,721
[45] Date of Patent: Mar. 9, 1999

[54] RADIO COMPUTER AUDIO-VIDEO TRANSMISSION DEVICE

[76] Inventor: Kerl Yen, No. 3 Tzu Chiang I Rd., Chung Li City Tao Yuan Hsien, Taiwan

[21] Appl. No.: 892,234

[22] Filed: Jul. 14, 1997

[51] Int. Cl.$^6$ ...................................................... H04N 7/00
[52] U.S. Cl. .............................. 345/327; 348/8; 348/552; 455/6.3
[58] Field of Search ..................................... 345/326, 327; 348/8, 552, 6, 7, 10, 12, 13, 725, 726, 729, 734; 455/6.3, 3.1, 3.2, 4.1, 4.2, 5.1, 6.1, 6.2

[56] References Cited

U.S. PATENT DOCUMENTS

| | | | |
|---|---|---|---|
| 5,111,296 | 5/1992 | Duffield et al. | 348/552 X |
| 5,359,367 | 10/1994 | Stockill | 348/552 |
| 5,722,041 | 2/1998 | Freadman | 455/6.3 |
| 5,787,259 | 7/1998 | Haroun et al. | 348/552 X |
| 5,790,201 | 8/1998 | Antos | 348/552 |

*Primary Examiner*—Nathan Flynn
*Assistant Examiner*—John W. Miller
*Attorney, Agent, or Firm*—Rosenberg, Klein & Bilker

[57] ABSTRACT

The subject invention relates to a type of radio computer audio-video transmission device, comprising a transmitter and a receiver, wherein the transmitter includes a 2.4 GHZ transmitting antenna, a UHF receiving antenna, a VGA and A/V output, a computer control output, a power input, a power output, an infrared output and such components, said transmitter serving to convert the computer images appearing on the computer monitor, through various processes, into 2.4 GHZ microwave demodulated signals, and transmit them through 2.4 GHZ transmitting antenna to the receiver; and when the receiving antenna of the 2.4 GHZ receiver receives the signals, the signals are then amplifyd and demodulated into general A/V output and transmitted to the TV; the receiver includes a 2.4 GHZ receiving antenna, a UHF transmitting antenna, an infrared ray inductor, an A/V output port and a power remote-control switch; said receiver serves to enable the infrared ray inductor to receive the infrared ray signals emitted from the infrared ray keyboard or the infrared ray mouse, and convert them into UHF remote-control signals, and transmit them through the UHF transmitting antenna to the transmitter; when the transmitter's UHF receiving antenna receives the signals, they are amplifyd, demodulated and transmitted to the keyboard control signals that are acceptable to general computers, and transmitted to the computer, so that the user may be able to pick up data or images from the computer monitor, by remote-controlling the computer through an infrared ray keyboard or infrared ray mouse, and display them onto the TV screen.

4 Claims, 4 Drawing Sheets

RADIO COMPUTER AUDIO-VIDEO TRANSMISSION DEVICE

FIELD OF THE INVENTION

The subject invention relates to a type of wireless computer audio-Video transmission device, particularly to a device that serially connect radio communication, computer technology and household electrical appliance into one unit to realize 3C applied integration.

Though the computer ownership ratio in most developed countries is very high, the size of most computer monitors is 14–15 inch, and most computers are installed in their study rooms, there will be the coming trend for the integration of computer and wireless control, under the existing science and technology development trend.

SUMMARY OF THE INVENTION

In view of that, the subject inventor has designed a method of utilization of radio modulation technology, based on many years experience in industrial production, to transmit the data, images and sound from the computer set in a study room to a larger TV screen installed at other locations (such as a guest room), and meanwhile, to send infrared-ray remote control signals back to the computer terminal, by way of reverse UHF circuit, to facilitate remote control of the computer, so that, the user will be able to use a radio infrared-ray keyboard or mouse to operate the whole computer system, thus enabling the expansion of computer application space and territory, adding better living quality and more universal application of computers, and fulfilling the "integration" in daily applications.

The objective of the subject invention is to provide a type of radio computer audio-video transmission device wherein a power remote-control switch is installed in the receiver, so the receiver will send signals through UHF to the transmitter, or send control commands through UHF, so that the user will be able to switch on or off the computer without having to run to where the computer is installed, thus full-aspect convenience can be achieved.

To enable better understanding of the objective, shape, configuration or device features and their functions of the subject invention, the following example of embodiment is described in details along with drawings:

BRIEF DESCRIPTION OF NUMERALS AND ELECTRICAL COMPONENTS

Figure 1:
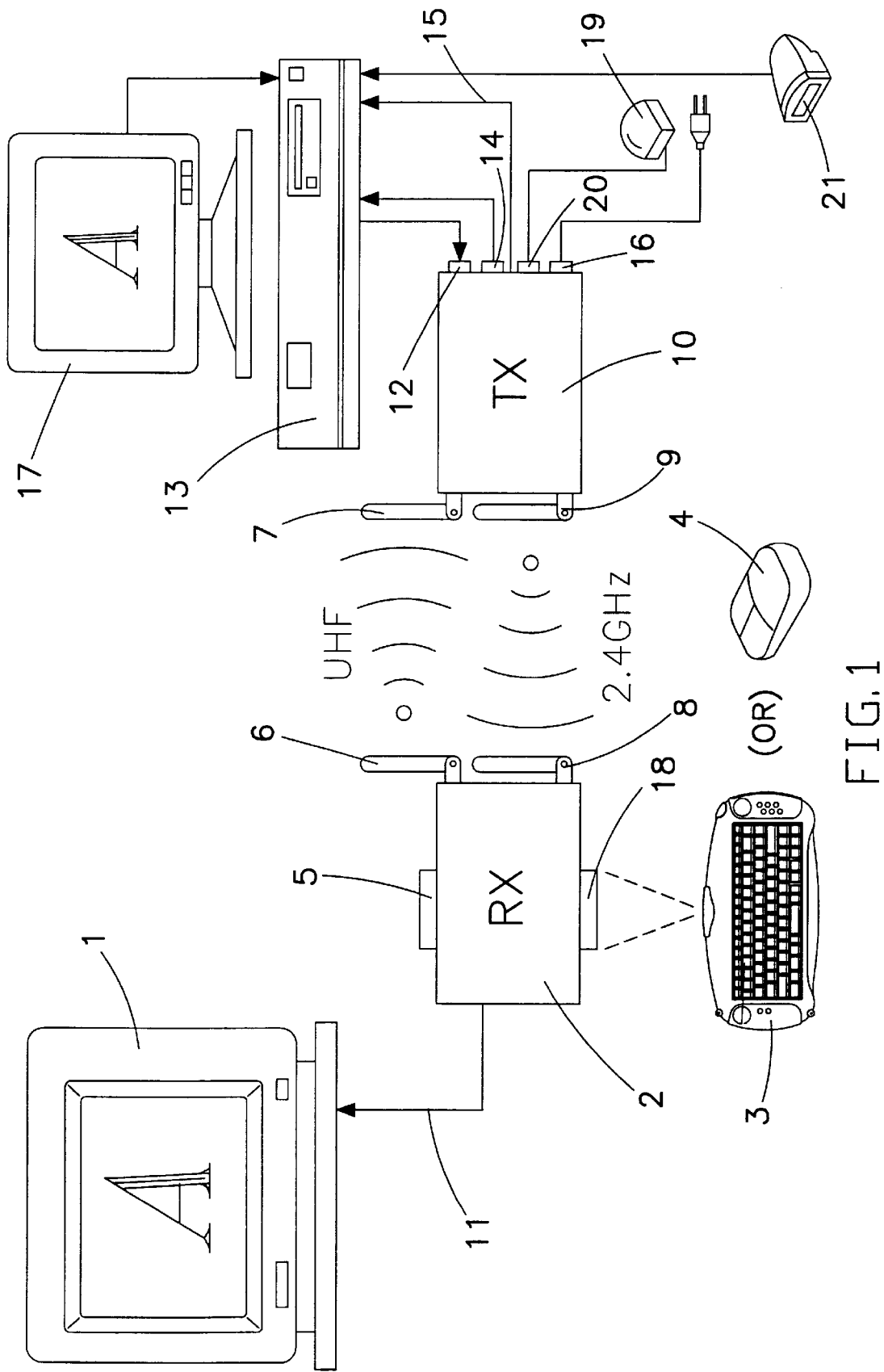
FIG. 1 is the embodied view of the subject invention.

| | |
|---|---|
| 1 A/V monitor (TV) | 11 A/V output |
| 2 receiver | 12 VGA and A/V input |
| 3 infrared ray keyboard | 13 computer main unit (PC) |
| 4 infrared ray mouse | 14 computer control output |
| 5 power remote-control | 15 power output |
| 6 UHF transmission antenna | 16 power input |
| 7 UHF receiving antenna | 17 computer monitor |
| 8 2.4 GHZ receiving antenna | 18 infrared ray inductor |
| 9 2.4 GHZ transmission antenna | 19 infrared ray transmitter |
| 10 transmitting unit | 20 infrared output terminal |
| 21 monitor (CCD) | |

DETAILED DESCRIPTION OF PREFERRED EMBODIMENT

Referring to FIGS. 1 through 4, the subject invention is a type of "radio computer audio-video transmission device" comprising a transmitter (Tx) 10 and a receiver (Rx) 2 and other components, wherein:

The transmitter (Tx) 10 comprises such components as a 2.4 GHZ transmission antenna 9, UHF receiving antenna 7, VGA and A/V input 12, computer control output 14, power output 15, power input 12, computer control output 14, power output 15, power input 16 and infrared ray output terminal, etc.; wherein, the computer control output 14 can be connected to the computer main unit 13, the computer main unit 13 being connected to a computer monitor 17 to facilitate control of computer operations, the power source of the computer main unit 13 connected to the power output of the transmitter (Tx) 10 to receive commands to switch on.

The receiver (Rx) 2 comprises such components as a 2.4 GHZ receiving antenna 8, UHF transmission antenna 6, infrared ray inductor 18, A/V output port 11 and power remote-control switch 5, etc.; wherein the receiver (Rx) 2 can be connected through an A/V output port 11 to an A/V appliance 1 equipped with A/V input terminal, generally a large-measurement TV; the infrared ray inductor 18 can receive the infrared ray signals emitting from an infrared ray keyboard 3 or an infrared ray mouse 4; the power remote control switch 5 will enable the receiver (Rx) 2 to send signals through UHF to the transmitter (Tx) 10, or send control commands through UHF to switch on or off the computer, so that the user will not have to run to where the computer is, and so the objective of all-aspect convenience can be achieved.

The transmitter (Tx) 10 serves to convert the images appearing on the computer monitor 17, after they are subjected to various processes, into 2.4 GHZ microwave demodulated signals (generally from FM frequency modulation to Am amplitude modulation) which are then transmitted through 2.4 GHZ transmitting antenna 9 to the receiver 2; after the signals are received by the 2.4 GHZ receiving antenna 8 of the receiver 2, they are amplifyd and demodulated into general A/V output and transmitted onto the TV 1.

When the infrared ray inductor 18 of the receiver (Rx) 2 receives the infrared ray signals emitted from the infrared ray keyboard 3 or the infrared ray mouse, it converts them into UHF remote control signals and transmit them through the UHF transmitting antenna 6 to the transmitter (Tx) 10; after the signals are received by the receiving antenna 7 of the transmitter (Tx) 10, they are amplifyd and demodulated into keyboard control signals that can be accepted by general computers, and transmitted to the computers.

Thus, the user can utilize such a process to pick up data or images from a remote-controlled computer, through an infrared ray keyboard 3 or an infrared ray mouse 4, and display them on the existing TV monitor.

Besides, the infrared ray output 20 of said transmitter (Tx) 10 is connected to an infrared ray transmitter 19, so the user can control the computer.

Figure 2:
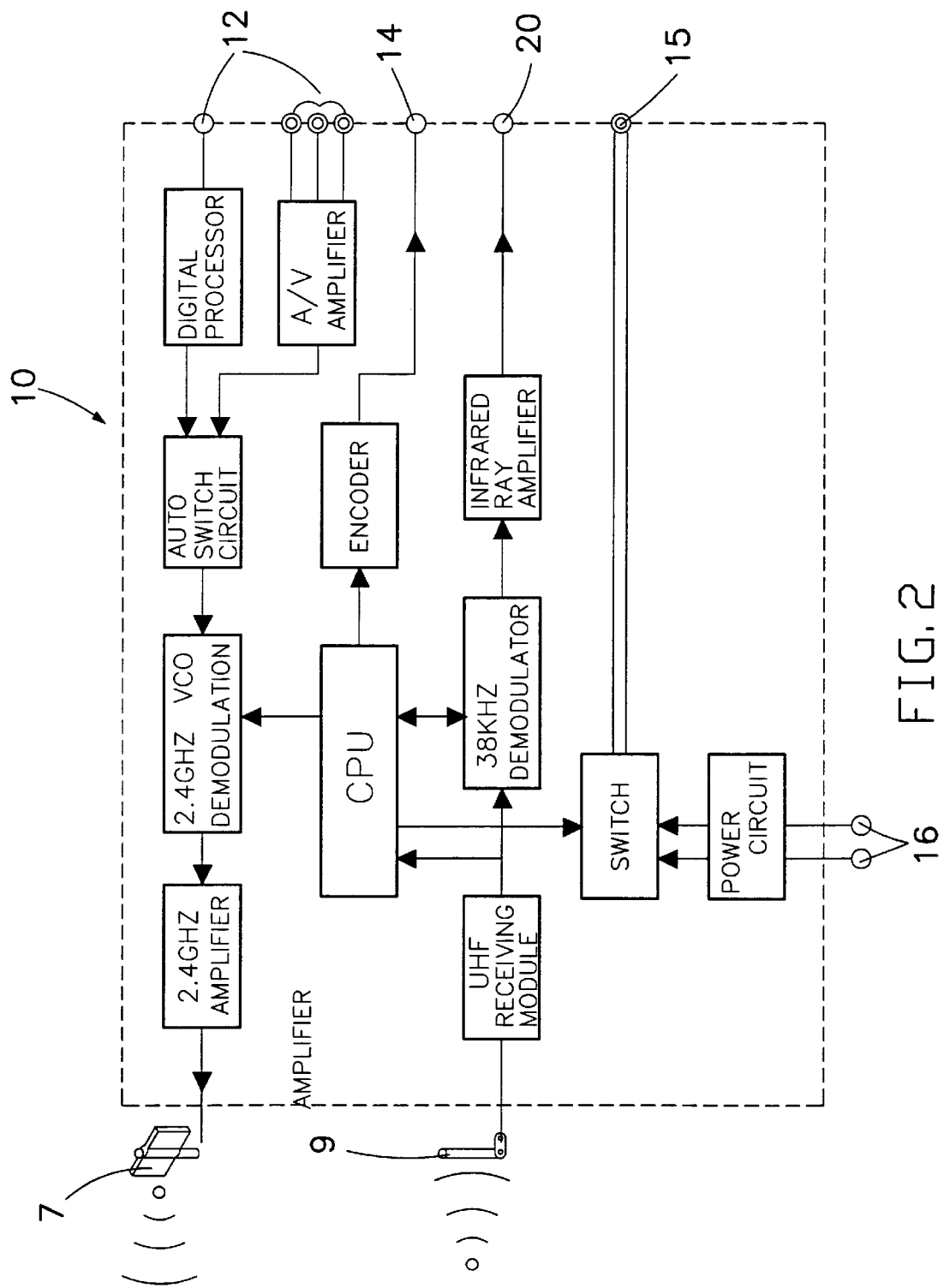
FIG. 2 is the block diagram of the transmitter of the subject invention.
Figure 3:
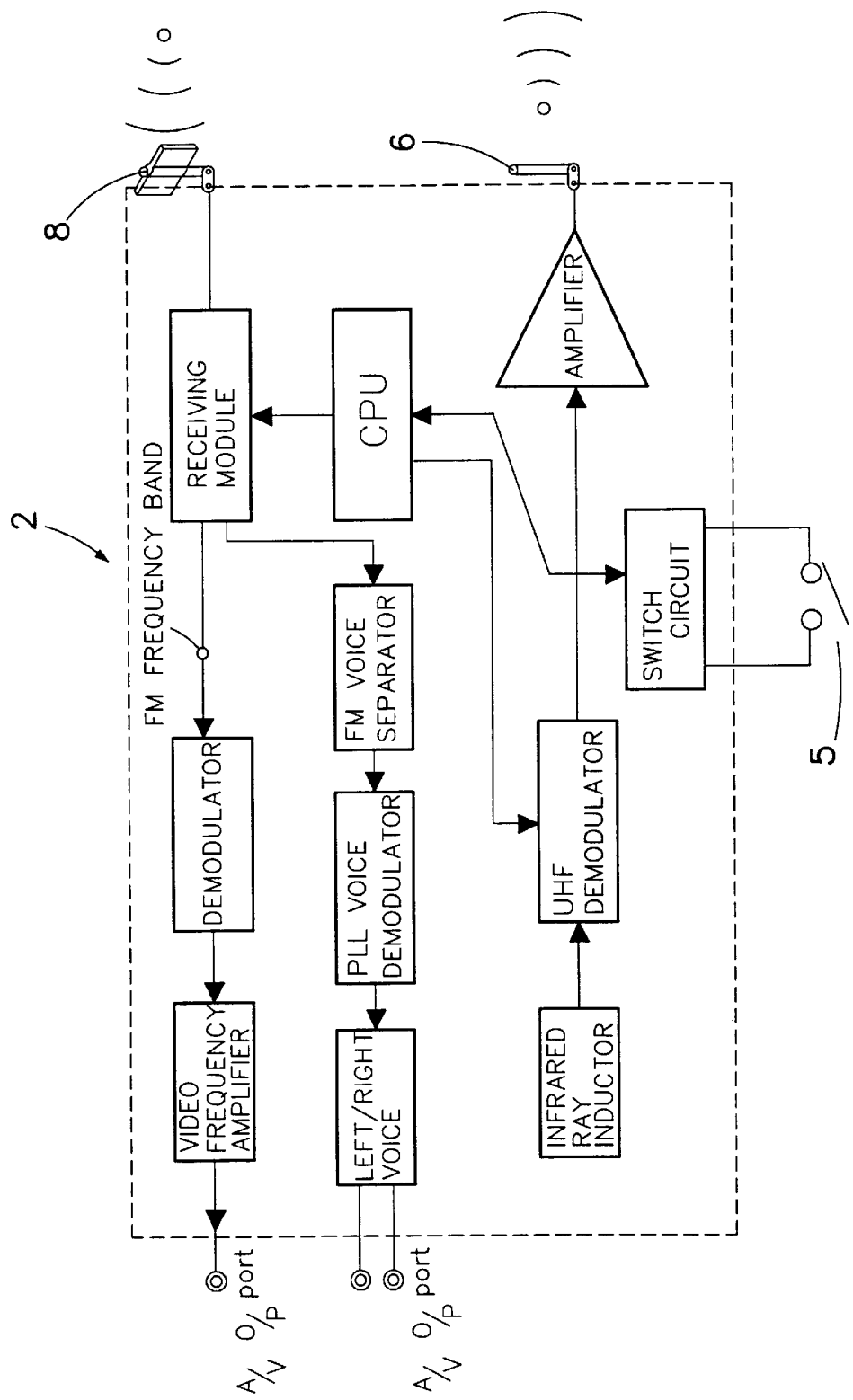
FIG. 3 is the block diagram of the receiver of the subject invention.
Figure 4:
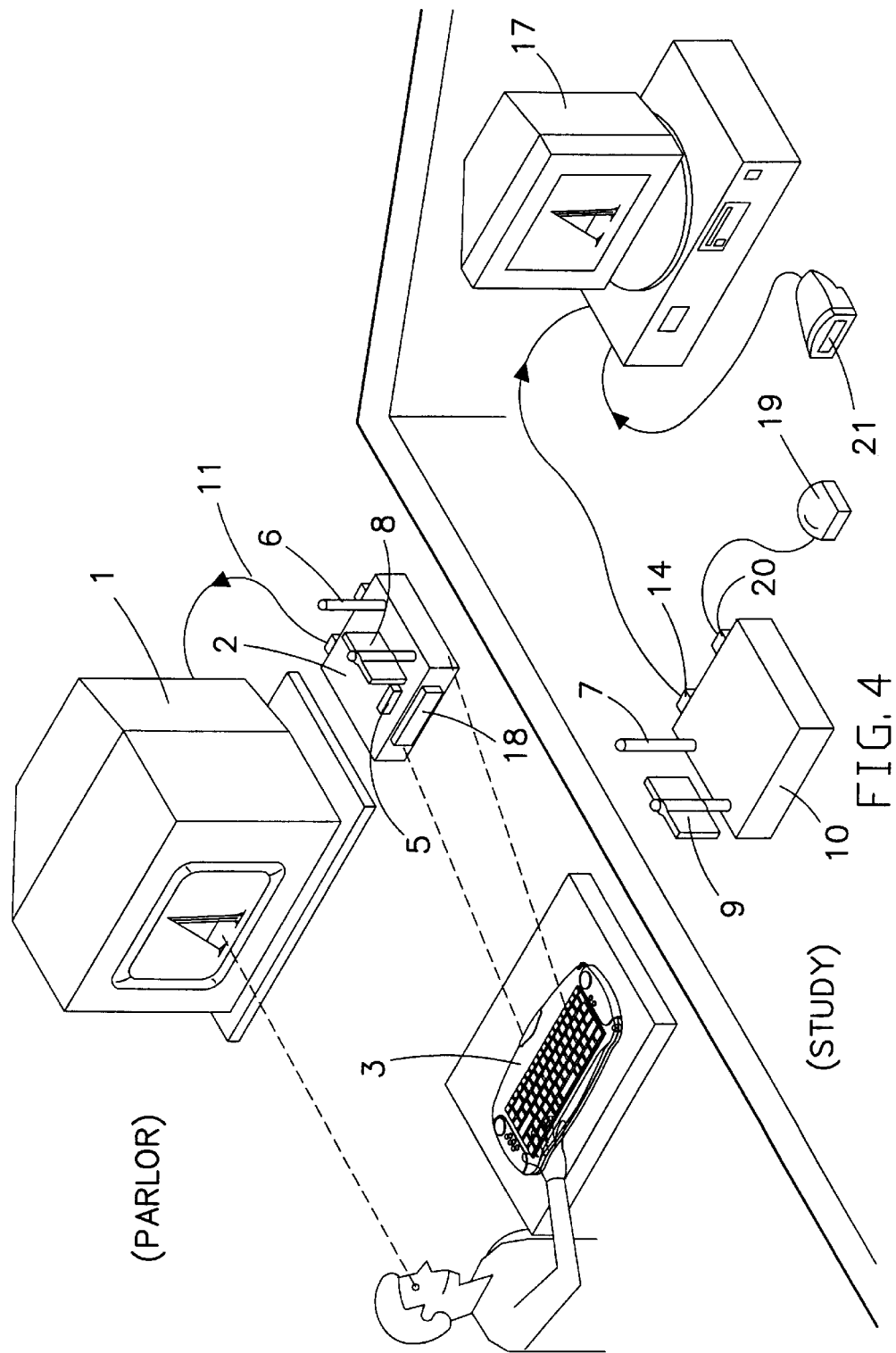
FIG. 4 is the view of the subject invention in application.

Referring to FIG. 2, the circuit components inside the transmitter (Tx) 10 are composed of several processors (DSP), A/V amplifier, automatic switch circuit, 2.4 GHZ VCO demodulation, 2.4 GHZ amplifier, CPU, encoder, switch, power circuit, 38 KHZ demodulation, UHF reception modules and infrared ray amplifiers, etc., wherein, the 2.4 GHZ amplifier is connected to 2.4 GHZ transmitting antenna 9; the UHF reception module is connected to UHF receiving antenna 7; the power circuit is connected to power input 16; the digital processing circuit (DSP) and A/V amplifier are respectively connected to VGA and A/V input 12; the encoder is connected to computer control output 14; the infrared ray amplifier is connected to infrared ray output 20; the switch is connected to computer AC power output 15.

Said automatic switch circuit serves to receive computer VGA signals coming from the digital processor, or the A/V signals coming from the A/V amplifier, and to convert such signals through 2.4 GHZ VCO demodulation into 2.4 GHZ microwave demodulated signals (generally from FM frequency modulation to AM amplitude modulation), then, said demodulated signals are amplified by the 2.4 GHZ amplifier before they are transmitted by the 2.4 GHZ transmitting antenna 9;

When the UHF receiving antenna 7 receives the signals, it will demodulate the such signals in the 38 KHZ demodulator, then the demodulated signals are transmitted through CPU and encoder to become control signals that can be accepted by general computers, and displayed onto the computer monitor; or the demodulated signals are amplifyd by the infrared ray amplifier and transmitted through the infrared ray output 20 to the infrared ray transmitter 9, so that the user will be able to control the computer.

Referring again to FIG. 3, the circuit components inside the receiver (Rx) 2 are composed of the receiving module, demodulator, video frequency amplifier, CPU, switch circuit, FM voice separation, PLL sound demodulator, left/right voice output, video frequency amplifier, UHF demodulator, infrared ray inductor, amplifier, switch circuit, etc.; wherein, the video frequency amplifier is connected to the power remote control switch 5; the receiving modulator is connected to 2.4 GHZ receiving antenna 8; the amplifier is connected to UHF transmitting antenna 6.

When the infrared ray inductor receives the infrared ray signals emitted from the infrared ray keyboard 3 or the infrared ray mouse 4, it will convert them through UHF demodulator into UHF remote-control signals, and such signals are amplifyd by the amplifyr and transmitted from the UHF transmitting antenna 6;

When the receiving modulator receives signals from the receiving antenna 8 of the 2.4 GHZ, the signals are demodulated and amplifyd by the demodulator and the video frequency amplifier into general A/V output and transmitted to the A/V appliance 1; and the signals are separated, demodulated and transmitted by the FM voice separator, PLL voice demodulator and the left/right voice output.

It is hereby declared that the above description, covering merely a best preferred example of embodiment, shall not be based to restrict or limit the structural characteristics of the subject invention, and that any easily conceivable variations or modifications (such as, the computer main unit may be connected to a CCD monitor 21) made by anyone skilled in the subject art shall be reasonably included in the intent and scope of the subject claim.

I claim:

1. A radio computer audio-video transmission device, comprising:

a transmitter, its interior circuit components composed of a 2.4 GHZ transmitting antenna, a UHF receiving antenna, a VGA and A/V input, a computer control output, a power input, a power output connected to an infrared ray output, wherein the computer control output can be connected to the computer main unit, the computer main unit being connected to a computer monitor to enable controlling of all computer operations, the power of the computer main unit being connected to a transmitter to receive commands for switching on operation, said transmitter serving to convert the images appearing on the computer monitor, after being subjected to processing, into 2.4 GHZ microwave demodulated signals, and then transmitted from the 2.4 GHZ transmitting antenna; or serving to demodulate, amplify and convert the signals received by the UHF receiving antenna into control signals that can be accepted by general computers, and display them onto the computer monitor; and a receiver, its interior circuit components composed of a 2.4 GHZ receiving antenna, a UHF transmitting antenna connected to an A/V output port, wherein the A/V output port being connected to an A/V appliance equipped with A/V input terminal, said receiver serving to, with its interior circuit component of an infrared ray inductor, receive the infrared ray signals emitted by the infrared ray keyboard or the infrared ray mouse, and convert them into UHF remote-control signals, and transmit them through the UHF transmitting antenna; or serving to demodulate and amplify the signals, after they are received by the 2.4 GHZ receiving antenna, and process them into general A/V output, and transmit them to the A/V appliance;

whereby, the user picks up data or images from the computer and displays them, by remote-control of the computer through an infrared ray keyboard or an infrared ray mouse, on the existing A/V appliance.

2. The radio computer audio-video transmission device, as recited in claim 1, wherein the receiver may include a power remote-control switch, so that the receiver may transmit signals through UHF to the transmitter, or may send control commands through UHF to switch on or off the computer.

3. The radio computer audio-video transmission device, as recited in claim 1, wherein the A/V appliance can be a TV set.

4. The radio computer audio-video transmission device, as recited in claim 1, wherein the transmitter may be connected through an infrared ray output terminal to the infrared ray transmitter, to facilitate the user to control the computer.

\* \* \* \* \*